Figure 1:
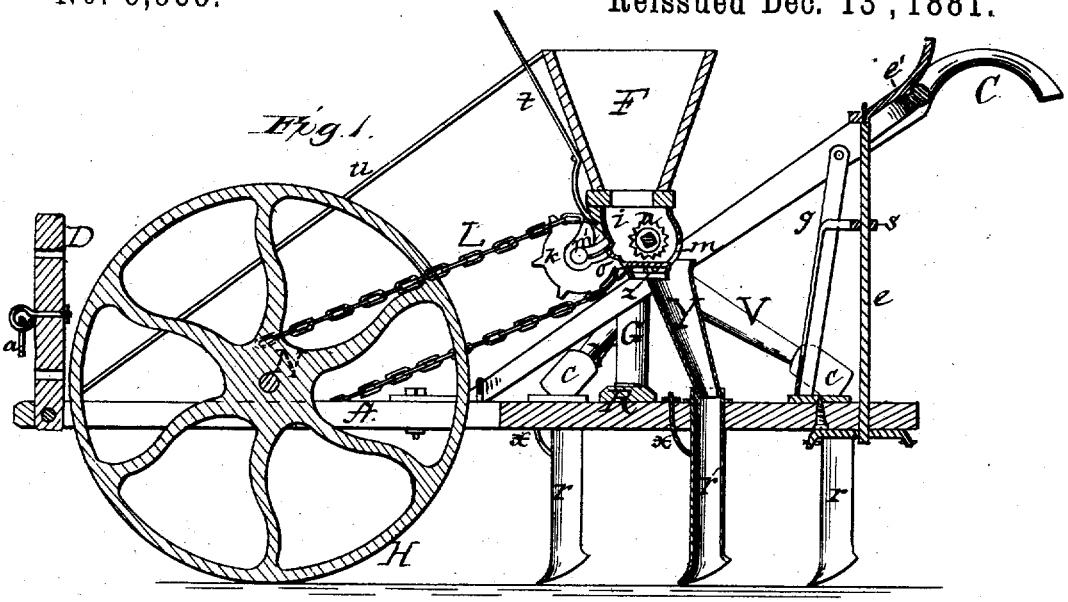

2 Sheets—Sheet 1.

J. R., S. B. & G. W. RUDE,

Assignors to RUDE BROTHERS MANUFACTURING COMPANY.

GRAIN DRILL.

No. 9,969. Reissued Dec. 13, 1881.

Witnesses
P. L. Quinn
E. M. Johnson

Inventors
J. R. Rude,
S. B. Rude,
G. W. Rude,
by Heylmun & Kane,
Attorneys.

N. PETERS, Photo-Lithographer, Washington, D. C.

2 Sheets—Sheet 2.

J. R., S. B. & G. W. RUDE,

Assignors to RUDE BROTHERS MANUFACTURING COMPANY.

GRAIN DRILL.

No. 9,969. Reissued Dec. 13, 1881.

Witnesses,
Franck L. Durand.
A. M. Johnson.

Inventor.
J. R. Rude.
S. B. Rude.
G. W. Rude.
by Heylmun & Kane,
Attorneys.

N. PETERS, Photo-Lithographer, Washington, D. C.

UNITED STATES PATENT OFFICE.

JOHN R. RUDE, SQUIRE B. RUDE, AND GEORGE W. RUDE, OF LIBERTY, INDIANA, ASSIGNORS TO RUDE BROTHERS MANUFACTURING COMPANY, OF SAME PLACE.

GRAIN-DRILL.

SPECIFICATION forming part of Reissued Letters Patent No. 9,969, dated December 13, 1881.

Original No. 95,607, dated October 5, 1869. Application for reissue filed August 24, 1881.

*To all whom it may concern:*

Be it known that we, J. R. RUDE, S. B. RUDE, and G. W. RUDE, of Liberty, in the county of Union and State of Indiana, have invented certain new and useful Improvements in Grain-Drills; and we do hereby declare the following is a full, clear, and exact description of the invention, that will enable others skilled in the art to which it appertains to make and use the same, reference being had to the accompanying drawings, and to the letters of reference marked thereon, which form a part of this specification.

This invention relates to that class of grain-drills in which the triangular-shaped frame is supported at the front end by a pilot or driving wheel and guided by an operator from behind grasping the handles of the machine.

Our invention consists in the combination, in a grain-drill, of seed-cups secured to the bottom of a seed-hopper under the respective seed-openings, and arranged between the bottom of the hopper and the central beam, and adjustable side beams or wings provided with seed connecting-tubes or conductors.

Our invention further consists in the combination of seed-cups secured to the bottom of a seed-hopper under the respective seed-openings, and movable or self-adjustable seed connecting-tubes or conductors, attached to the seed-cups so as to hang below the bottom of the seed-cups and between the central beam and the adjustable side beams or wings, whereby the seed-conductors will automatically accommodate themselves to the adjustment of the side beams or wings.

Our invention further consists in the combination, in a grain-drill, of a center beam with a driving-wheel, adjustable side beams or wings, a seed-hopper, and seed-cups with seed-wheels and movable or self-adjustable seed connecting-tubes or conductors.

Our invention further consists in the combination, with a seed-cup having at its base a slot, of a seed-conductor having a journal-pin or pivot at its upper end working in the slot, whereby the conductor is capable of forward and backward movements.

Our invention further consists in the novel construction of a seed-wheel having its shaft bearing in the center thereof.

Our invention further consists in the combination of the seed cases or cups, the distributing seed-wheels, and the operating mechanism.

Our invention further consists in the novel construction and combination of parts, as will be hereinafter more fully described and claimed.

Figure 3:
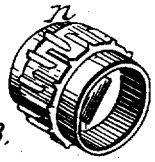
Figure 4:
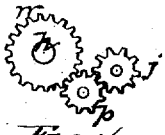
Figure 2:
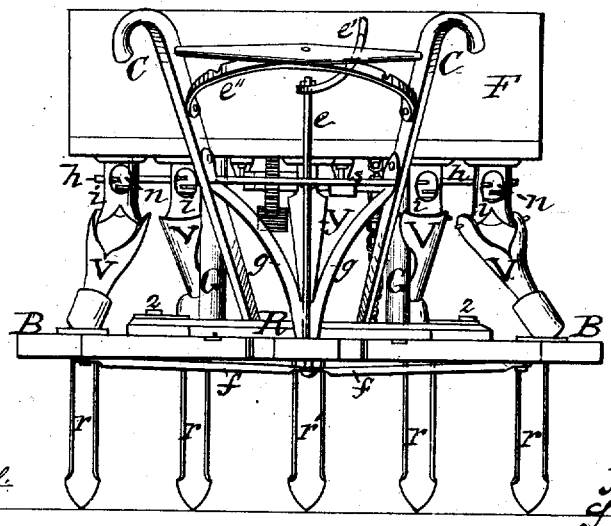
Figure 5:
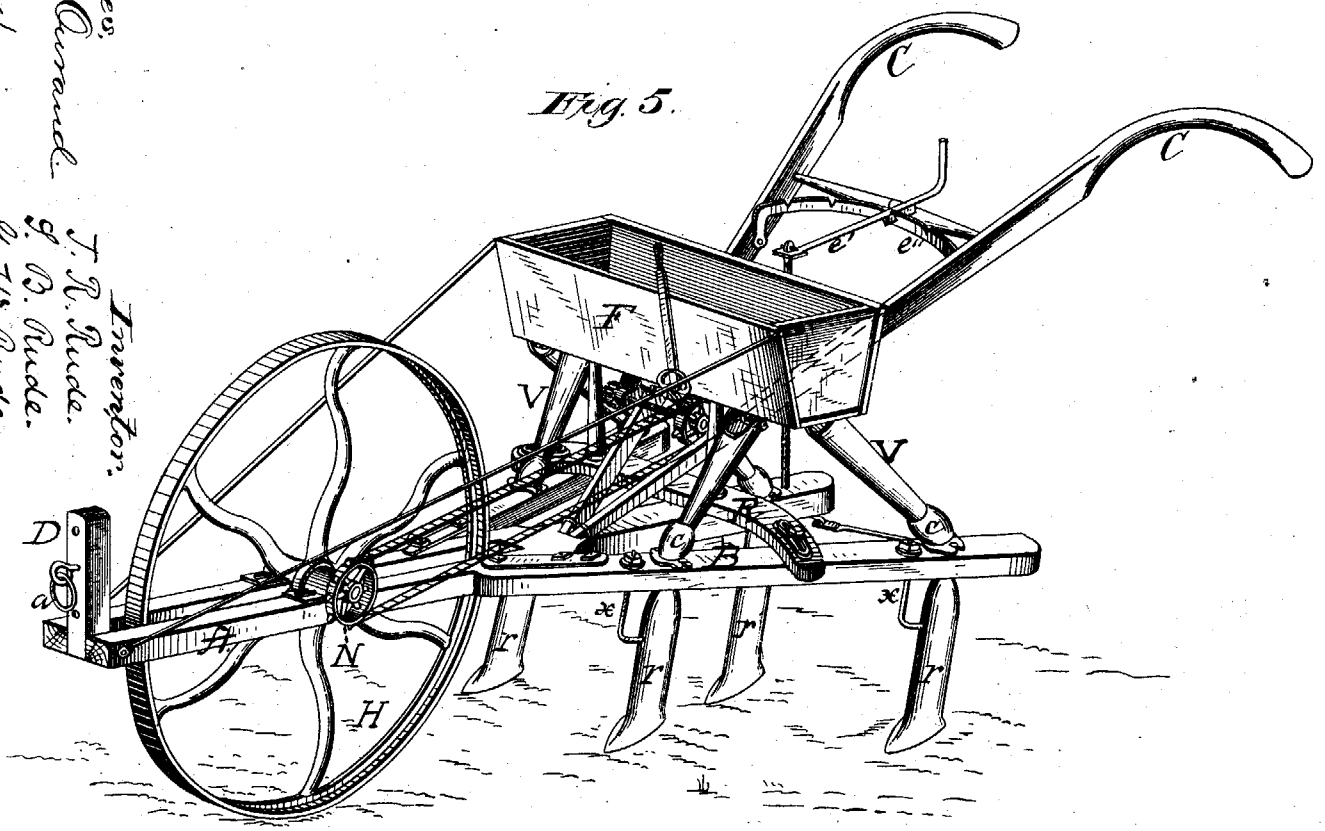

In the accompanying drawings, Figure 1 represents a central longitudinal sectional view of our machine. Fig. 2 is an end view of the same. Fig. 3 is a perspective view of one of the feed-wheels. Fig. 4 is a detached view of the gearing; and Fig. 5 is a front view, in perspective, of the machine.

In the drawings, the letter A represents the central beam of the machine, formed with a longitudinal slot at its front end for the reception of the driving-wheel H. The shaft of this driving-wheel is supported by means of journal-boxes attached to the upper surface of the beam. To the front end of the beam A, and in the slot thereof, is secured an upright or bar, D, with a plurality of perforations for the draw-hook *a*, to which the horse is attached; and to the rear end of the beam A is attached the bifurcated brace *g*, which serves as means for attaching and supporting the handles C C of the grain-drill, as seen in Fig. 2 of the drawings.

The letter B designates the side beams, hinged to the central beam, near the front end of the latter, and on opposite sides, at an acute angle, so as to form side wings to the central beam. These side beams, hinged to the central beam at their front ends, are provided at their rear ends with two jointed levers, *f f*, to which the vertical rod *e* is attached by means of the crank-arm, for expanding or contracting the side beams to suit rows of different width. This rod *e* is supported vertically by passing through the rear end of the beam A and through the cross brace-bar *s* of the bifurcated brace *g*, and the upper end thereof is provided with a handle, *e'*, which engages with a notched segment, *e''*, arranged between the handles C C, serving to secure the handle and consequently the side beams in their adjusted position.

The letter F represents the seed-box resting on the supports or posts G G, secured to the cross-bar R, which is rigidly attached to the central beam. This cross-bar R is slotted at its ends, through which the bolts 2, attached to the side beams or wings, B B, pass, and the beams are confined thereto by nuts. The office of these slots in the ends of the cross-bar is to allow the hinged or pivoted side beams or wings to be adjusted outward or inward, as may be desired, without detaching the seed-conducting tubes V, the construction of which will be hereinafter described. The seed-box F has a series of openings at the bottom for the issue of the seed, and to the bottom of the seed-box, over these openings, (see Figs. 1 and 2,) are secured the seed cups or cases *i*, with rear discharge orifices or openings, *m*.

The letter *n* represents the feed-wheels arranged within the seed-cups. Each of these feed-wheels (see Fig. 3) is constructed with a square central bearing, so as to come in the center of the wheel, and the periphery is formed with alternating broken cogs constituting the seed feed surface.

The letter *h* represents a horizontal shaft passed through the seed-cups and the feed-wheels *n* located therein. It is plain from an examination of Figs. 1 and 2 of the drawings that the feed-wheels *n*, penetrated and revolved by the shaft *h*, and working in the seed-cups and directly under the openings in the seed-box, serve to discharge the seed from the seed-cups through the discharge-orifices *m* in the rear wall of the seed-cups. The lower ends of the seed-cups, (see Fig. 1,) below the floor of the cup, are formed with slots extending in the direction of the length of the machine to receive the pivots *z* of the seed-conductors.

The letter V represents the seed conductors or connecting-tubes, enlarged or expanded at their upper ends, and provided with pivots *z*, working in the slots at the base of the seed-cups, substantially as seen in Fig. 1 of the drawings. The lower ends of these tubes fit easily and loosely within the hollow bulbs *c*, connected to the upper surfaces of the side beams or wings over the drills *r*, substantially as seen in Figs. 1 and 2 of the drawings.

The letter Y represents the central seed conductor or connecting-tube, constructed similarly to the tubes V, and forms a communication with the drill *r'*, as seen in Fig. 1 of the drawings. This construction of the seed-conducting tubes will permit them to conform to the adjustment of the side wings and catch the grain as discharged from the seed-cups and conduct it to the drills for the furrows. The drills *r r'*, with hoes or shovels attached, are braced to their connecting-beams by means of the curved rods *x*, and these drills are made concave on their rear side to afford a safe passage of the seed into the furrow.

The letter *m'* represents a counter-shaft, which works in two hangers, *o o*, beneath the seed-box F, and these hangers *o o* are slotted, so that the gearing of the two wheels *p* and *j* on the shaft *m'* may be properly adjusted. The wheel *j*, it will be observed, gears into the spur-wheel *w* on the shaft *h*, and thus operates the feed-wheels *n*.

To the projecting end of the axle H the sprocket-wheel N is secured, and to the counter-shaft *m'* a similar sprocket-wheel, *k*, is attached.

The letter L represents a chain which passes over the sprocket-wheels N and *k*, and thus motion is imparted to the shaft *m'* and shaft *h*, on which the feed-wheels *n* are secured.

The sprocket-wheel *k* may be made to disconnect the gearing by means of the lever *t*.

The letters *u u* represent two rods extending from the outer ends of the seed-box to the front end of the beam A, as braces.

The operation of our machine is as follows: As the machine is moved forward the pilot or driving-wheel imparts motion to the shaft *h*, carrying the feed-wheels, through the agency of the chain and gearing, thus rotating the feed-wheels to discharge the seed out of the seed-cups through the discharge-orifices. The operator at the rear, as he guides the machine, can readily see the feed of all the cups, and detect if an obstruction should exist in any of the cups.

Having thus described our invention fully, what we claim as new, and desire to secure by Letters Patent, is—

1. The combination, in a grain-drill, of seed-cups attached to the bottom of a seed hopper or box under the respective seed-openings thereof, and arranged between the bottom of the hopper and the central beam, and adjustable side beams or wings provided with seed connecting-tubes or conductors, establishing a communication with the seed-cups, substantially as described.

2. The combination, in a grain-drill, of seed-cups attached to the bottom of a seed-box under the respective seed-openings, and movable or self-adjustable seed connecting-tubes or conductors attached to the seed-cups, so as to hang below the bottom of the seed-cups and connected to the adjustable beams, whereby the seed connecting tubes will automatically accommodate themselves to the adjustment of the side beams, substantially as described.

3. The combination, in a grain-drill, of seed-cups attached to the bottom of a seed-box under the respective seed-openings, rotating feed-wheels arranged in the seed-cups, movable or self-adjusting seed connecting-tubes, and side adjustable beams, substantially as described.

4. The combination, in a grain-drill, of a central beam with driving-wheel, adjustable side beams or wings, a seed-box, seed-cups, feed-wheels, and self-adjusting seed connecting-tubes, substantially as and for the purpose set forth.

5. In a grain-drill, the combination, with a seed-cup having at its base a slot, of seed conductor or connecting-tube having a journal or pivot at its upper end working in the slot of the seed-cup, for the purpose stated.

6. The feed-wheels constructed substantially as described, so that the bearings come on shaft *h* in the center of feed-wheels, for the purpose as set forth.

7. In combination with the feed-wheel shaft carrying the feed-wheels, seed-cups, and connecting-gearing, the counter-shaft *m'*, receiving motion from the driving-wheel H by means of chain-belt L and wheels N and *k*, substantially as set forth.

8. The combination, with the feed-wheel shaft carrying the feed-wheels, seed-cups, and connecting-gearing, of the slotted hangers *o*, supporting the counter-shaft *m'*, for the purpose as set forth.

9. The counter-shaft *m'* and slotted hangers *o*, in combination with wheels *p*, *j*, and *w* and lever *t*, arranged in the manner set forth.

10. Seed-cups *i*, the feed-wheels *n*, pinions *j* and *p*, chain L, toothed wheels *k* and N, and driving-wheel H, the whole combined and arranged as and for the purpose set forth.

In testimony whereof we affix our signatures in presence of witnesses.

JOHN R. RUDE.
SQUIRE B. RUDE.
GEORGE W. RUDE.

Witnesses:
S. C. ROBESON,
GEO. DRIGGS,
L. H. STANFORD.